United States Patent [19]

Jinsenji et al.

[11] 4,334,751
[45] Jun. 15, 1982

[54] EASY-TO-LOAD ROLL-FILM CAMERA

[75] Inventors: Sei Jinsenji, Tanashi; Yubao Jibiki, Kawasaki, both of Japan

[73] Assignee: Ricoh Co., Ltd., Tokyo, Japan

[21] Appl. No.: 193,451

[22] Filed: Oct. 3, 1980

[30] Foreign Application Priority Data

Oct. 9, 1979 [JP] Japan .................................. 54-130411
Oct. 9, 1979 [JP] Japan .................................. 54-130412

[51] Int. Cl.³ ............................................. G03B 17/28
[52] U.S. Cl. .................................... 354/288; 354/212
[58] Field of Search ............... 354/202, 203, 212, 288; 242/74

[56] References Cited

U.S. PATENT DOCUMENTS 2,662,696 12/1953 Nerwin .............................. 242/74 X
3,276,341 10/1966 Kremp et al. ........................ 354/212
3,377,935 4/1968 Furusawa ............................ 354/212

FOREIGN PATENT DOCUMENTS 66782 5/1969 German Democratic Rep. ..................................... 354/212

Primary Examiner—John Gonzales
Attorney, Agent, or Firm—Oblon, Fisher, Spivak, McClelland & Maier

[57] ABSTRACT

A camera of the type wherein a perforated strip of film is unrolled from a magazine in a magazine chamber at one end of the camera body and wound up by a takeup spool in a spool chamber at its opposite end. In order to afford easy loading of the film, the takeup spool is provided with one or more film catcher blades of arcuate cross section each pivotally mounted thereon along one edge extending parallel to the spool axis. The opposite edge of each film catcher blade is spring biased away from the surface of the takeup spool and normally held separated therefrom. Formed on each film catcher blade is at least one projection which, upon rotation of the takeup spool in a predetermined direction, becomes engaged in one of the perforations in the film thereby permitting the spool to wind up the film. The camera is further equipped with a magazine orienting member pivotally mounted on the back cover of the camera body and spring-loaded into engagement with the magazine in the magazine chamber. Upon closure of the back cover the magazine orienting member acts to properly orient the protruding mouth of the magazine in the magazine chamber.

3 Claims, 10 Drawing Figures

EASY-TO-LOAD ROLL-FILM CAMERA

BACKGROUND OF THE INVENTION

This invention relates to cameras in general and, in particular, to those for use with a perforated strip of film rolled in a magazine. More particularly, the invention deals with improved means for expediting the loading of such a magazine and the subsequent threading of the film in a camera.

A roll-film camera of the type in question usually requires a troublesome process of magazine loading and film threading. The user first drops the magazine into a magazine chamber at one end of the camera body. Then, pulling the leader of the film out of the magazine, he must insert its end into a slit in a takeup spool rotatably mounted in a spool chamber at the opposite end of the camera body. The user proceeds to engage the film perforations with a feed sprocket or sprockets, while making sure that the spool will properly take up the film. The back cover of the camera body is then closed. The loading operation is completed when the user takes one or more unexposed shots.

Not only is this usual method of magazine loading troublesome and time-consuming, but also it often invites failure of the takeup spool in winding up the film. Recently, therefore, camera makers the world over have suggested a variety of measures for easier, more positive loading of the roll-film magazine in the camera.

Typical of such recent proposals is what is trade-named "Konireel", mounted on some Konica cameras. The Konireel is, in essence, a takeup spool having two tubes nested one within the other. The outer tube has a plurality of slots extending parallel to the spool axis. The film leader is inserted into one of these slots. On actuation of the windup lever, the inner tube revolves to engage the film leader between itself and the outer tube.

Another conventional measure is known as "Canon Quick Loading (QL) System" featuring three friction members pivotally mounted on the takeup spool and sprung away therefrom. Another feature of the QL system is a film guide mounted on the camera body for pivotal motion with its back cover. As the windup lever is turned, the film leader placed over the takeup spool is wrapped around the same by advancing in frictional contact with the friction members and in sliding contact with the film guide and with the arcuate surface bounding the spool chamber.

These and similar conventional devices are in common subject to the objection that the takeup spool and associated film guiding or winding means are complex in construction. The result is the higher production costs of cameras incorporating such devices. Further, the user of a conventional device tends to worry that the takeup spool may not be winding up the film, it being rather difficult for him to visually ascertain the wrapping of the film around the spool.

Another difficulty heretofore encountered in loading the magazine arises from the unavoidable curling of the film unrolled therefrom. When the film leader is threaded into engagement with the takeup spool, the curled film tends to direct the tangentially projecting mouth of the magazine obliquely upward. Thus the film will not easily engage with the feed sprocket or sprockets and, in some instances, may become disengaged from the takeup spool or may not be properly rolled thereon. Further, upon closure of the back cover, the curled film may become slack between magazine and spool, or its leading end may slip out of engagement with the spool. Particularly with cameras equipped for a self-winding function, the user may not notice such a failure in the film moving mechanism.

SUMMARY OF THE INVENTION

The present invention seeks to make materially easier and faster the loading of a roll-film magazine in a camera. For attaining this objective the invention solves, first of all, the problem of how to cause the takeup spool of the camera to positively engage and wind up the film unrolled from the magazine, without significantly adding to the manufacturing cost of the camera. It also overcomes the conventional difficulty relating to the establishment of the correct attitude of the magazine in the magazine chamber.

Stated in brief, the invention features at least one film catcher blade of arcuate cross section pivotally mounted on the takeup spool along one edge extending axially of the spool. The film catcher blade has its opposite, free edge biased away from and normally held separated from the surface of the takeup spool. Formed on the outer surface of the film catcher blade, in the vicinity of its free edge, is at least one projection for engagement in one of the usual perforations in the film unrolled from the magazine in the magazine chamber.

In use, therefore, the user simply places the film leader, which has been pulled out of the magazine in the magazine chamber, over the takeup spool and closes the back cover. The film leader will then be held against the film catcher blade. Consequently the projection on the film catcher blade will become engaged in one of the film perforations without fail if then the takeup spool is rotated in the prescribed direction. Thus wound up on the takeup spool, moreover, the film urges the film catcher blade into close contact with the spool in spite of the force biasing the free blade edge away therefrom, so that the takeup spool together with the film catcher blade forms a substantially cylindrical spool assembly to permit the neat rolling of the film thereon. The invention gains these advantages merely by adding one or more film catcher blades, complete with a projection thereon, to the takeup spool.

Another aspect of this invention concerns a magazine orienting member pivotally mounted on the inside surface of the back cover of the camera body. The orienting member is biased, as by a spring, to press the magazine into the magazine chamber. During the closure of the back cover the free edge of the orienting member engages the mouth of the magazine and revolves the same in the magazine chamber until the magazine mouth becomes correctly oriented therein.

Thus the magazine acquires a correct attitude in the magazine chamber simply as the back cover is closed. Unrolled from the correctly oriented magazine, the film can be threaded into proper engagement with the takeup spool assembly in spite of its possible curling. The orienting member coacts with the improved takeup spool assembly to materially simplify the loading of the magazine, and the subsequent threading of the film, in the camera, precluding errors in magazine loading and film transport.

The above and other objects, features and advantages of this invention and the manner of attaining them will become more apparent, and the invention itself will best be understood, from the following description and appended claims, taken in conjunction with the attached drawings.

DETAILED DESCRIPTION OF THE INVENTION

Figure 1:
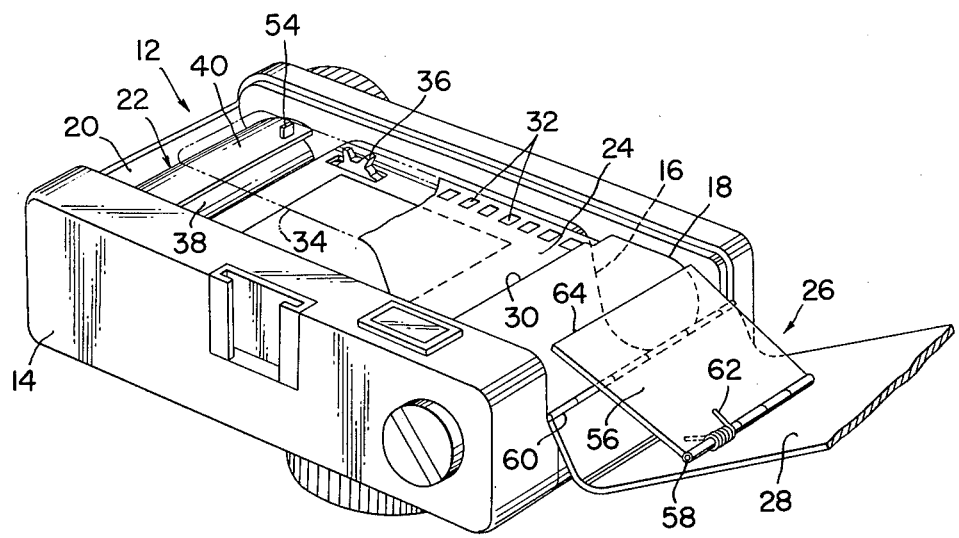
FIG. 1 is a perspective view of the camera incorporating the novel concepts of this invention, the camera being shown with its back cover opened to reveal the improved parts of the invention as well as the film magazine loaded therein.
Figure 2:
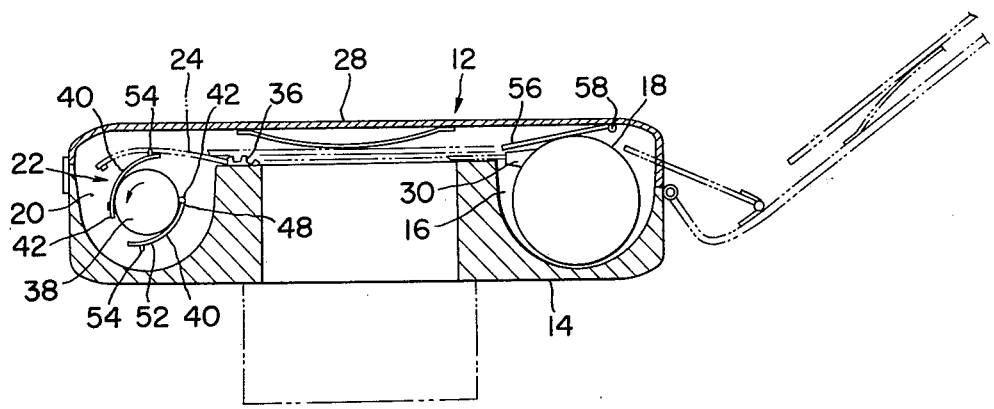
FIG. 2 is a sectional view taken along a plane perpendicular to the axis of the film magazine of the camera of FIG. 1.

FIGS. 1 and 2 of the attached drawings show the present invention as adapted specifically for a 35-mm roll-film camera. Generally designated 12, the illustrated camera broadly comprises:

1. a light-tight body or enclosure 14 having a magazine chamber 16, in which is to be mounted a roll-film magazine 18, and a spool chamber 20 at its opposite ends;
2. a takeup spool assembly 22 rotatably mounted in the spool chamber 20 for winding up a strip of film 24 unrolled from the magazine 18 in the magazine chamber 16; and
3. a magazine orienting mechanism 26 mounted on a hinged back cover 28 of the camera body 14 for correctly orienting the magazine 18 in the magazine chamber 16.

The magazine 18 for use with the camera 18 is of the familiar make having the strip of film 24 rolled therein. A mouth 30 protrudes tangentially from the magazine 18 for feeding out the film 24. Also as has been standardized in the art, the film 24 has two series of perforations 32 formed along its opposite lateral edges, only one such series of perforations being seen in FIG. 1. FIGS. 1 and 2 show the leader 34 of the film pulled out of the magazine 18. A conventional feed sprocket is shown at 36 for propelling the film 24 from the magazine 18 to the takeup spool assembly 22.

Figure 3:
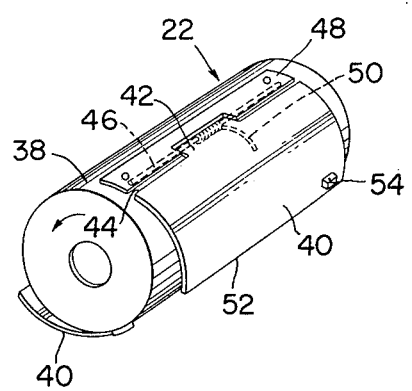
FIG. 3 is an enlarged perspective view of the takeup spool assembly in the camera of FIGS. 1 and 2.
Figure 4:
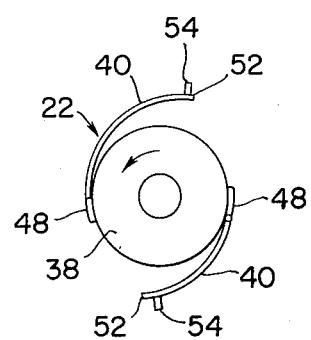
FIG. 4 is an end view of the takeup spool assembly of FIG. 3.
Figure 5:
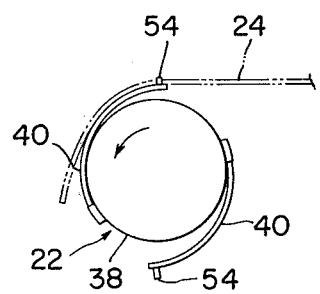
FIG. 5 is a view similar to FIG. 4 except that the takeup spool assembly is shown engaged with the film fed from the loaded magazine.
Figure 6:
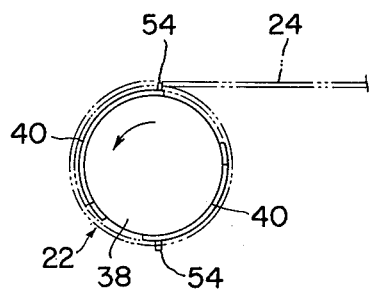
FIG. 6 is also a view similar to FIG. 4 except that the film is shown wound up on the takeup spool assembly.

As best shown in FIG. 3, as well as in FIGS. 4, 5 and 6, the takeup spool assembly 22 includes a takeup spool proper 38 rotatably mounted in the spool chamber 20. One or more, two in the illustrated embodiment, film catcher blades 40 are pivotally mounted on the takeup spool 38 in diametrically opposed positions thereon. Each film catcher blade 40 is shown as a substantially rectangular plate of arcuate cross section, curved with a radius approximately equal to the radius of the takeup spool 38. A tongue 42 projects from one longitudinal edge 44 of each film catcher blade 40 and is pivotally coupled to a pivot pin 46 extending parallel to the axis of the takeup spool 38. The pivot pin 46 is anchored to the takeup spool 38 by a support member 48.

It is thus seen that each film catcher blade is pivotally mounted on the takeup spool 38 along its longitudinal edge 44 extending parallel to the spool axis. A comparatively light torsion spring 50 biases the opposite free edge 52 of each film catcher blade 40 away from the surface of the takeup spool 38, normally holding the free blade edge 52 separated to a preassigned degree from the spool surface. For winding up the film 24 the takeup spool 38 is revolved in the arrow marked direction so that the free edge 52 of each film catcher blade 40 lags behind its pivoted edge 44.

Formed on the outer surface of each film catcher blade 40, in the vicinity of its free edge 52, is at least one projection 54 which is dimensioned and positioned for engagement in one of the film perforations 32. The illustrated camera 12 has only one feed sprocket 36 for transporting the film 24 by engaging one of the two series of perforations 32. Preferably, in this type of camera, only one projection 54 should be formed on each film catcher blade 40, for engagement with the same series of perforations as the single feed sprocket 36. If the film catcher blades 40 are to be fabricated from sheet metal, the projections 54 can be formed, at the time of pressing operation on the sheet metal, by cutting and bending parts of the blades.

FIG. 5 shows the projection 54 on one of the film catcher blades 40 engaged in one of the film perforations 32. When the film 24 is subsequently wound around the takeup spool assembly 22 as shown in FIG. 6, the film catcher blades 40 are urged into close contact with the spool proper 38 against the bias of the torsion springs 50. Thus the complete takeup spool assembly 22 assumes a substantially cylindrical shape when the film 24 is rolled thereon.

Figure 7:
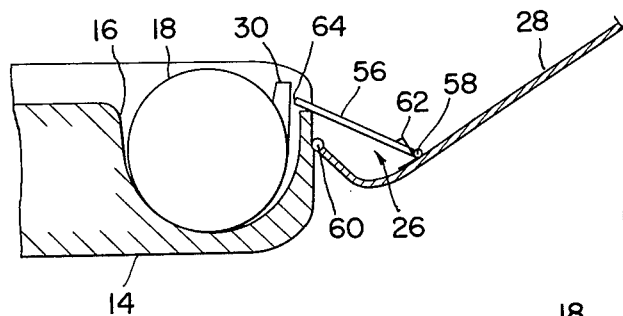
FIG. 7 is a fragmentary sectional view showing in particular the magazine orienting mechanism in accordance with the invention, the view showing the camera with its back cover opened and with the magazine dropped therein in an incorrect attitude.
Figure 8:
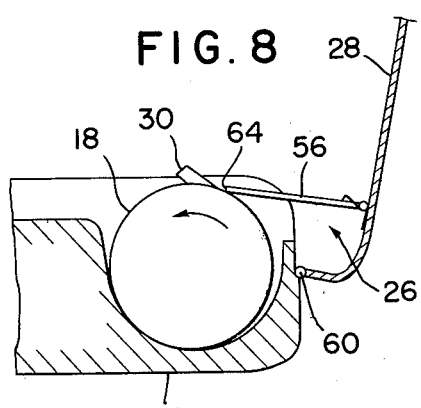
FIG. 8 is a view similar to FIG. 7 except that the back cover is shown being closed, with the magazine orienting mechanism operating to reorient the magazine.
Figure 9:
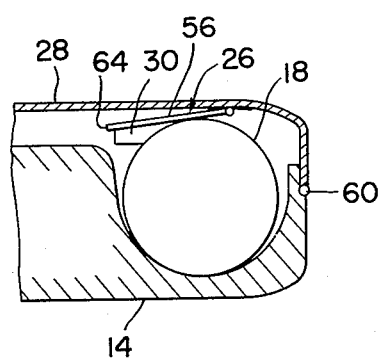
FIG. 9 is also a view similar to FIG. 7 except that the back cover is shown completely closed, with the magazine correctly oriented by the orienting mechanism.

With reference back to FIGS. 1 and 2, and further to FIGS. 7, 8 and 9, the magazine orienting mechanism 26 includes a magazine orienting member 56 which takes the form of a rectangular plate in this particular embodiment of the invention. The magazine orienting plate 56 is pivotally mounted at 58 on the inside surface of the back cover 28 of the camera body 14. The back cover 28 is hinged at 60 to the end of the camera body 14 where the magazine chamber 16 is disposed. The pivoted edge 58 of the magazine orienting plate 56 lies close to the hinged end 60 of the back cover 28. A torsion spring 62 biases the magazine orienting plate 56 in such a direction that upon closure of the back cover 28, the magazine orienting plate presses the magazine 18 down into the magazine chamber 16.

As inspection of FIGS. 7 through 9 will reveal that the free edge 54 of the magazine orienting plate 56 is intended to abut against the protruding mouth 30 of the magazine 18 in the magazine chamber 16 during the closure of the back cover 28. The dimension of the magazine orienting plate 56 between its edges 58 and 64 should be such that upon complete closure of the back cover 28, the magazine orienting plate completely covers the mouth 30 of the magazine 18 correctly oriented in the magazine chamber 16.

In the loading operation, the user first places the magazine 18 into the magazine chamber 16 in a prescribed direction. He then pulls the leader 34 of the film 24 out of the magazine mouth 30 and places the film leader over the takeup spool assembly 22, as shown in FIGS. 1 and 2. Then the user simply closes the back cover 28. During the closure of the back cover the free edge 64 of the magazine orienting plate 56 slides over or abuts against the magazine 18 under the bias of the torsion spring 62, as will become better understood from the following description of FIGS. 7 through 9.

Let it be assumed that the magazine 18 has been dropped into the magazine chamber 16 with its mouth 30 directed upwardly as pictured in FIG. 7. Then the magazine orienting plate 56 will abut against the back of the magazine mouth 30 and turn the magazine in the direction of the arrow in FIG. 8 during the closure of the back cover 28. Thus, upon complete closure of the back cover 28, the orienting plate 56 will correctly orient the magazine mouth 30 and retain the magazine 18 in the correct attitude under the bias of the torsion spring 62, as depicted in FIG. 9. The length of the film 24 that has been pulled out of the magazine 18 is now properly positioned across the film gate of the camera body 14 as in FIG. 2. If the magazine has been dropped into the magazine chamber in the correct attitude, then the orienting plate 56 will simply slide over the magazine.

Following the closure of the back cover, the user proceeds to cause rotation of the takeup spool assembly 22 in the predetermined film winding direction indicated by the arrows in FIGS. 2 through 6. The rotation of the takeup spool assembly may be either manual, by spring action, or by electric power. Being biased outwardly by the torsion springs 50, the film catcher blades 40 on the takeup spool 38 revolve in sliding contact with the film 24, until the projection 54 on either blade becomes engaged in one of the film perforations 32 as in FIG. 5.

With the continued rotation of the takeup spool assembly 22, the film 24 urges the film catcher blade 40 into close contact with the spool 38 against the force of the spring 50. The projection 54 on the other film catcher blade will subsequently become engaged in one of the film perforations 32. Then the film 24 also presses this second blade against the spool 38. Now the takeup spool assembly 22 takes on a substantially cylindrical shape, as shown in FIG. 6, so that the film is rolled as on a conventional takeup spool without the film catcher blades.

After exposure of all the frames of the film 24 the user rewinds it back into the magazine 18 in the usual manner. The film catcher blades 40 will spring back to their normal positions upon disengagement of their projections 54 from the film perforations 32.

Figure 10:
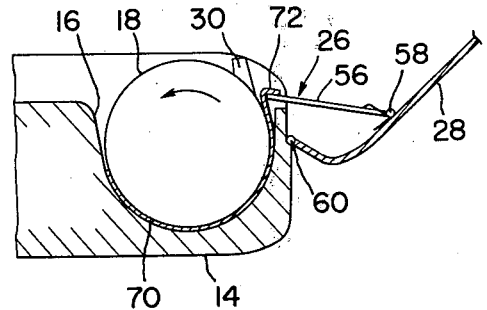
FIG. 10 is a view corresponding to FIG. 7 but showing a modified magazine orienting mechanism.

FIG. 10 shows a modified magazine orienting mechanism 26a. Included in this modification is a magazine cradle 70 in the form of an arcuately curved band of a material having a high coefficient of friction with respect to the surface of the magazine 18. The magazine cradle 70 is fitted in the magazine chamber 16 for angular displacement and operatively coupled at 72 with the free edge of the magazine orienting plate 56. When the magazine 18 is loaded in the magazine chamber 16, the magazine cradle 70 encircles approximately the lower half of the magazine in frictional contact therewith.

In the operation of the modified magazine orienting mechanism 26a, the orienting plate 56 itself functions just as in the above described mechanism 26. Further, during the closure of the back cover 28, the orienting plate 56 causes angular displacement of the magazine cradle 70 in a counterclockwise direction, as viewed in FIG. 10. This angular displacement of the magazine cradle takes place with the cradle in frictional contact with the magazine 18 and in sliding contact with the surface of the camera body bounding the magazine chamber 16. Thus the magazine cradle coacts with the orienting plate to more positively establish the correct attitude of the magazine in the magazine chamber.

It is to be understood that the foregoing disclosure is by way of example only, and modifications and variations of the invention will readily occur to those skilled in the art. For example, although the illustrated takeup spool assembly 22 has two film catcher blades 40, it will function satisfactorily if provided with only one such blade. The one or more film catcher blades, moreover, may be of comb-like or other suitable construction, instead of being in the form of a plate as in the foregoing embodiment. Further, the film catcher blade or blades may be made of resilient material and supported in a cantilever fashion on the takeup spool so as to be self-biased away therefrom, rather than being mounted thereon by means of a pivot pin or pins and biased by a separate spring or springs. The magazine orienting member 56 could also be of comb-like or other configuration. It will also be apparent that the invention finds application to other than the illustrated type of camera.

All these and other modifications and variations within the usual knowledge of the specialists are understood to fall within the scope of the present invention.

What is claimed is:

1. In a camera for use with a perforated strip of film rolled in a magazine formed to include a mouth protruding tangentially therefrom for feeding out the film, in combination:

(a) a body having a magazine chamber and a spool chamber at opposite ends thereof, the magazine chamber being for accommodating the magazine;

(b) a takeup spool rotatably mounted in the spool chamber for winding up the film unrolled from the magazine in the magazine chamber;

(c) at least one film catcher blade of arcuate cross section pivotally mounted on the takeup spool along one edge of said blade extending parallel to the axis of the takeup spool, the opposite edge of the film catcher blade being biased away from and normally held separated from the surface of the takeup spool;

(d) at least one projection formed on the outer surface of the film catcher blade in the vicinity of said opposite edge thereof for engagement, upon rotation of the takeup spool in a predetermined direction, in one of the perforations in the film unrolled from the magazine, the film catcher blade being held against the surface of the takeup spool in spite of the biasing force when the film is wound up by the takeup spool;

(e) a back cover pivotally mounted on the end of the body where the magazine chamber is disposed;

(f) a magazine orienting member pivotally mounted on the inside surface of the back cover and biased to press the magazine into the magazine chamber, the magazine orienting member being effective, during the closure of the back cover, to engage the mouth of the magazine so as to correctly orient the magazine in the magazine chamber; and (g) a magazine cradle rotatably fitted in the magazine chamber so as to make frictional contact with the magazine, the magazine cradle being operatively coupled to the magazine orienting member and coacting therewith to correctly orient the magazine in the magazine chamber when the back cover is closed.

2. The camera as set forth in claim 1, wherein the magazine cradle is in the form of an arcuately curved band of a material capable of offering high frictional resistance to the surface of the magazine.

3. The camera as set forth in claim 1 or 2, wherein the magazine orienting member is in the form of a substantially rectangular plate, and wherein a spring is provided to bias the magazine orienting member.

* * * * *